Nov. 5, 1940.  J. F. GREENE  2,220,096

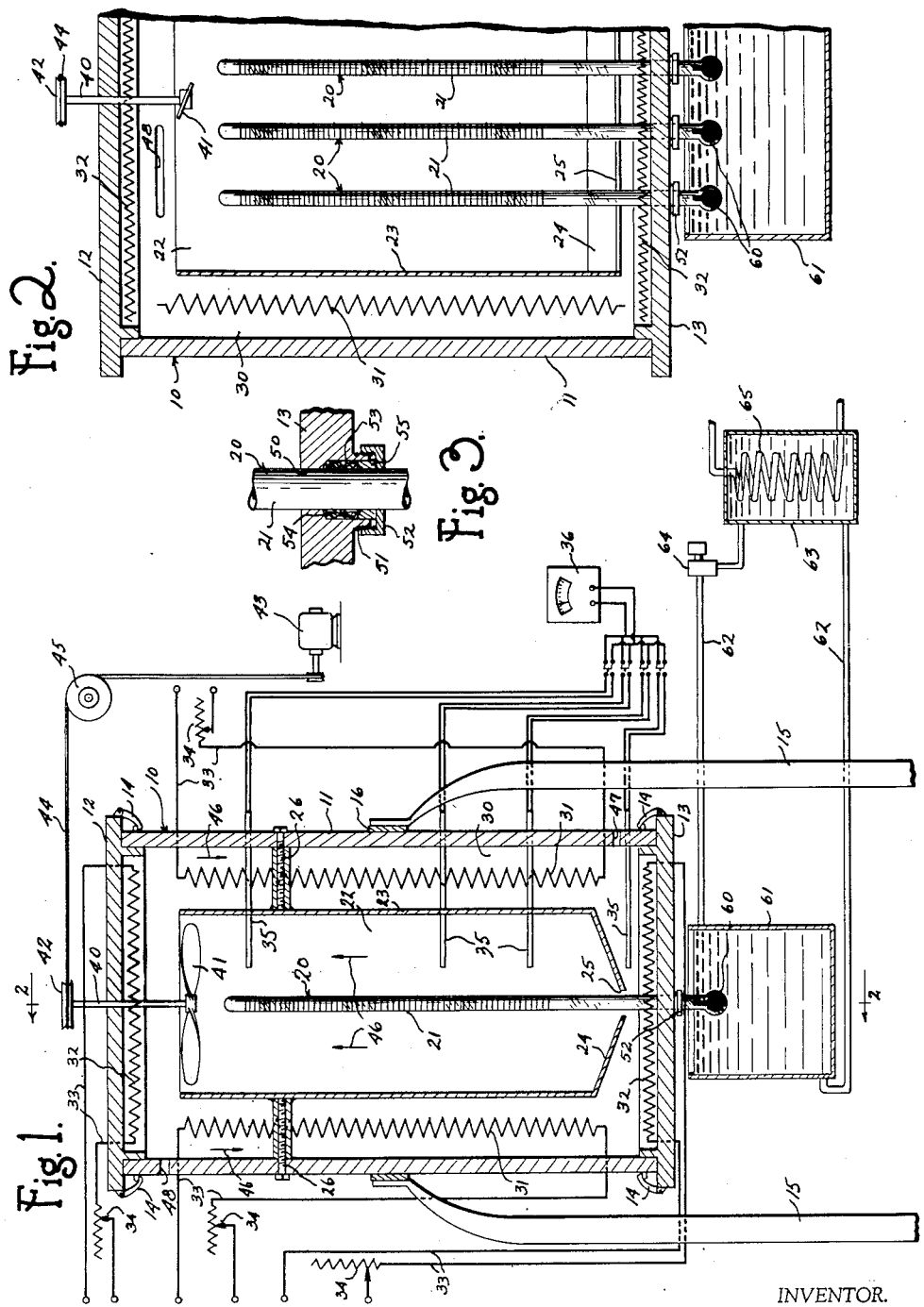

APPARATUS FOR FORMING THERMOMETER SCALES

Filed May 1, 1937  2 Sheets-Sheet 2

INVENTOR.
Joseph F Greene
BY Charles B. Belknap
ATTORNEY.

Patented Nov. 5, 1940

2,220,096

UNITED STATES PATENT OFFICE 2,220,096

APPARATUS FOR FORMING THERMOMETER SCALES

Joseph F. Greene, Vineland, N. J., assignor to Kimble Glass Company, Vineland, N. J., a corporation of Illinois Application May 1, 1937, Serial No. 140,272

1 Claim. (Cl. 219—35)

This invention relates to a method and apparatus for coloring the graduation lines, numerals and the like which constitute the scale of a thermometer.

One of the primary objects of this invention is to provide a method and apparatus of the above-mentioned character by which the coloring material may be so affixed to the thermometer tube as to be highly resistant to continued handling and to immersion of the thermometer in solvents and the like.

Numerous other objects and advantages of this invention will become more apparent as the following description proceeds.

It is well-known that certain vitreous or ceramic coloring materials are highly resistant to the action of chemicals and the like. In applying such coloring materials to glassware, however, it is necessary to subject the glassware to an elevated temperature sufficient to fuse or mature the coloring material and form a bond thereof with the glass so that the ceramic color may attach itself substantially permanently to the glass. While most pieces of chemical and laboratory glassware may be subjected to the necessary firing heat, the subjection of a thermometer to such a temperature has heretofore presented a difficult problem.

In the manufacture of a thermometer it is necessary to first place the expansible medium such, for example, as mercury, in the bulb portion of the thermometer and to then seal the thermometer at both ends. The thermometer is then subjected to certain known temperatures to determine the height to which the medium will expand and the tube of the thermometer is then marked at these points of known temperatures. The remainder of the tube is then graduated, the graduation lines and the numerals being usually incised on the tube in any desired manner as by etching or by the use of an abrasive wheel or the like.

If the incisions thus formed on the thermometer should now be filled with a ceramic or vitreous coloring material, and the thermometer then subjected to a firing heat of sufficient degree to mature the coloring material, the indicating medium would expand to such an extent as to rupture the thermometer. For this reason it has heretofore been the custom to fill the incisions with coloring compounds such as resins, enamels and the like, which, however, do not stand up well under continued handling, and which are not resistant to the action of many solvents with which the thermometer may have to come into contact.

To provide a thermometer in which the graduation lines, numerals and the like may be properly colored, without the use of non-resistant paints, resins and the like, the present invention provides a method and an apparatus whereby ceramic coloring materials may be utilized and these coloring materials matured so as to unite with the glass of the thermometer without however, so expanding the temperature responsive medium in the thermometer as to break the latter. It might be noted that in referring to coloring materials, no particular colors are intended to be specified since the incisions may be filled with a white material or in fact a material of any color desired.

The method consists in applying the ceramic coloring material of the desired color to the lines and the numerals forming the thermometer scale. The stem portion of the thermometer on which the scale is located is then placed in an oven or the like and subjected to a temperature sufficient to mature the ceramic coloring material, so that the latter attaches itself substantially permanently to the glass tube. During this heating of the thermometer tube, however, the bulb portion of the thermometer which contains the expansible medium is shielded from the heat of the firing oven and is positively cooled by the circulation of a cooling medium. The cooling medium is caused to circulate around the bulb portion of the thermometer during the entire heating period, and also after the heating period has been terminated so that no expansion of the expansible material which might cause breakage of the thermometer takes place. After the heating of the scale portion of the thermometer has been discontinued and the thermometer has cooled to a desired degree, the bulb portion of the thermometer may be removed from the cooling medium.

In carrying out the method various types of apparatuses might be utilized. As illustrative of the types of apparatus which might be utilized, reference should be made to the accompanying drawings wherein—

Fig. 1 is a diagrammatic sectional view through one form of apparatus constructed in accordance with the teachings of this invention;

Fig. 2 is a longitudinal sectional view of another form of the invention;

Fig. 3 is an enlarged fragmentary view of a portion of the structure shown in Fig. 2;

Figure 4:
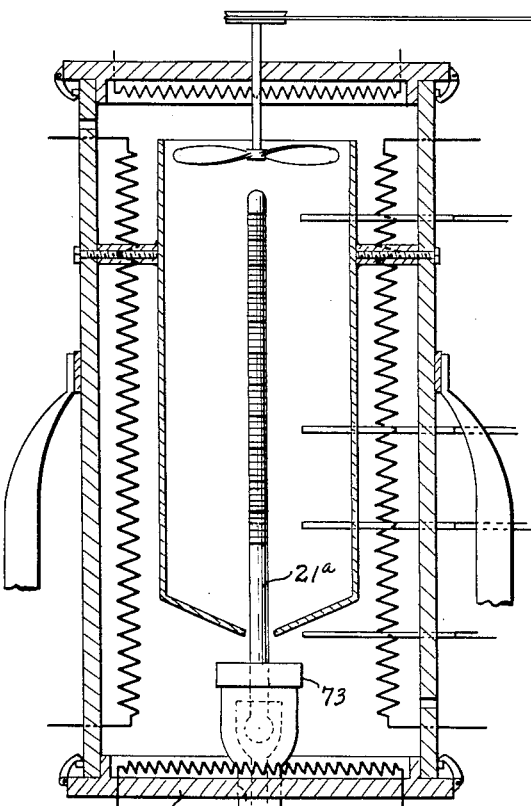
Fig. 4 is a view similar to Fig. 1 showing a slightly modified form of construction.

Referring then to the drawings wherein like reference characters designate corresponding parts throughout all views, the numeral 10 designates generally a furnace comprising an outer shell 11, a top cover 12 and a bottom cover or floor 13. The covers 12 and 13 are removable and are held in position to close the shell 11 by any suitable means such, for example, as the catches or latches 14. The oven is supported in spaced relation with respect to the floor in any desired manner as, for example, by the legs 15 which may be joined to a band 16 which embraces the shell 11.

The shell may be of any desired cross sectional shape, but is illustrated as being elongated or round so that, if desired, a plurality of thermometers 20 may be disposed within the shell and fired in a single operation, as shown in Fig. 2. While the thermometers are being fired the stem portions 21 thereof are disposed in a chamber 22 located within a shell 23 fixed within the shell 11 and in spaced relation to the walls thereof. The shell 23 is open at its top and is provided with a bottom 24 which is slotted or apertured as at 25 to receive the tube portions 21 of the thermometers. The shell 23 may be fixed within the shell 11 in any desired manner as, for example, by suitable bolts 26.

The shell 23 cooperates with the outer casing or shell 11 to provide a chamber 30 which wholly surrounds the inner chamber 22. Disposed in the chamber 30 are suitable electric heating elements 31, while disposed in the covers 12 and 13 are additional electric heating elements 32. All of the heating elements are connected by suitable conductors 33 to a source of electrical energy and located in each circuit is a rheostat 34 by which the flow of electricity to each heating coil or element may be controlled. Thermo-couples 35 are disposed at spaced points within the oven and these thermo-couples are connected to a suitable indicating mechanism such, for example, as the pyrometer 36 whereby the temperature within the oven at various points therein may be readily determined.

Extending through the top cover 12 and journalled therein is a shaft 40 which drives a fan 41 located within the shell 23 adjacent the upper end thereof. The fan may, however, be exterior of the shell. The shaft 44 carries exteriorly of the oven a pulley 42 which is driven from a motor 43 by a belt 44 which may pass over suitable idler pulleys 45.

The shell 23 shields the thermometer tubes 21 from direct radiation of heat from the heating elements 31, while the fan 41 effects a circulation of air through the oven and around the heating elements in the manner illustrated by the arrows 46. It will be noted that the air is drawn upwardly through the chamber 22 and is then directed downwardly over the heating elements 31, entering the chamber 22 at its lower end through the openings or slot 25. Suitable openings 47 and 48 are formed in the shell 11, the opening 47 being disposed at the lower end thereof and the opening 48 at the upper end thereof so that a limited amount of fresh air may be drawn in through the lower opening, and vapors may be expelled through the upper opening.

As more clearly illustrated in Fig. 3 of the drawings, lower cover or floor 13 is provided at spaced points with openings 50 and with upwardly extending threaded flanges 51 surrounding these openings. The openings are designed to receive the thermometer tubes 21, while threaded on the flanges 51 are gland nuts 52. The flanges 51 are spaced from the openings 50 to provide stuffing boxes 53 which receive asbestos packing 54, this packing being compressed by a gland follower 55 which is forced into engagement with the packing when the gland nut 52 is threaded downwardly on the flange 51.

The packed glands secure the thermometers in the lower floor 13 with the bulbs 60 of the thermometers disposed exteriorly of the oven and in a position to be shielded from the heat of the oven. Removably disposed below the oven so as to receive the bulbs 60 is a trough or chamber 61 which is connected by suitable flexible conduits 62 to a reservoir 63. Disposed in one of the conduits 62 is a pump 64 which circulates a refrigerant from the reservoir 63 through the chamber 61 and then back to the reservoir. A cooling coil 65 is located in the reservoir, this cooling coil being connected to any suitable refrigerating device (not shown).

While any desired cooling fluid may be utilized, it has been found that the anti-freeze solution commonly known as "Prestone" is particularly satisfactory, since it combines a low viscosity, a low freezing point and a low volatility. It is to be understood however, that any desired cooling fluid may be utilized such as air or the like, the arrangement being such, however, that a cooling fluid is continuously circulated in contact with the bulbs 60 of the thermometers, so as to prevent the expansion of the expansible medium in these bulbs.

In operation, one or more thermometers are fixed in the floor 13 and this floor is then secured in position on the oven with the stems or tubes of the thermometers projecting upwardly into the chamber 22. As previously pointed out the bulbs 60 project outside of the oven and are sealed from the heat of the oven by the asbestos packed glands which secure the thermometers in position. The chamber 61 is then brought into position so that the bulbs 60 of the thermometers will be contacted by the cooling fluid circulating through this chamber.

The circulation of the cooling fluid is then initiated and the thermometer bulbs cooled to the desired extent after which the electric heating elements are energized to bring the temperature of the chamber 22 up to that required to mature the ceramic coloring material which has previously been inserted in the incisions on the thermometer tubes. While the temperatures to which the chamber 22 is subjected will vary dependent upon the type of glass used in the thermometers, the temperature is maintained somewhat below the annealing point of the glass but above the fusing point of the coloring means. Thus the ceramic coloring material will be fused to the glass tubes 21 and thus permanently affixed in the incisions in these tubes. As an example, it might be noted that the temperature in chamber 22 may, for example, be brought up to approximately 780° F. for lead glass, this temperature being above the fusing point of the ceramic coloring material and below the annealing point of the glass. It is necessary that the temperatures be controlled as outlined above to obviate the introduction of permanent strains between those portions of the stem subjected respectively to heating and cooling.

During the entire firing of the thermometer tubes, the bulbs of the thermometers are cooled by the cooling medium circulating through the chamber 61 with the result that the expansible medium in the bulbs 60 will not expand to such a degree as to distort or break the tubes of the thermometers. After the firing has been continued for the desired length of time, the electric current to the heating elements is cut off and the furnace either allowed to cool with the thermometers disposed in the same, or the bottom plate 13 is removed to withdraw the thermometer tubes from the chamber 22. If either practice is followed, the circulation of the cooling medium is continued until the thermometer tubes have cooled to the point where substantially no heat will be transmitted by conduction from the heated tube portions of the thermometers to the bulb portions thereof. Obviously, a plurality of floor members 13 may be provided so that one may be in the process of being filled with thermometers while the other supports the thermometers during the cooling thereof.

Figure 5:
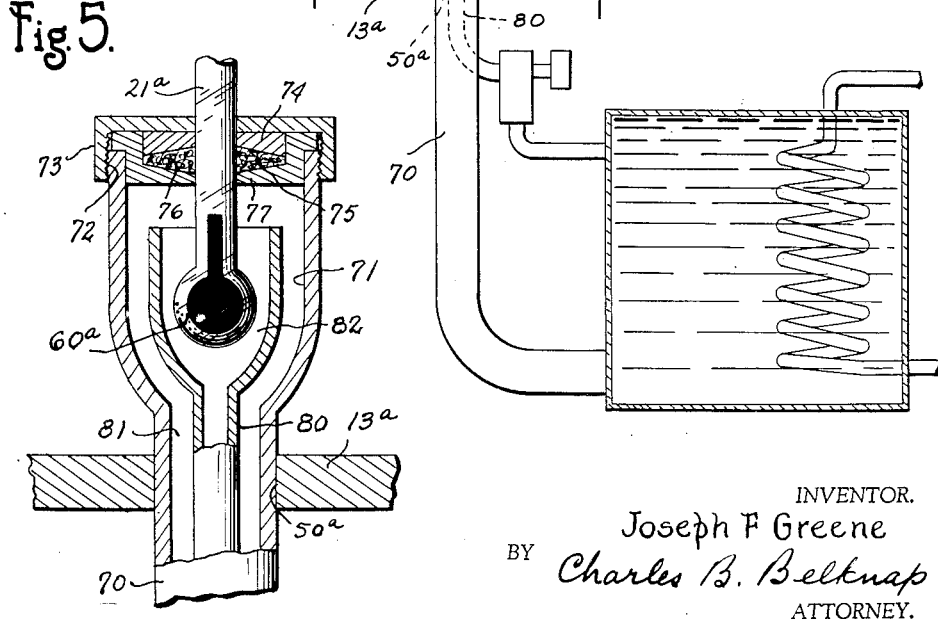
Fig. 5 is an enlarged view of a part of the structure shown in Fig. 4.

In Figs. 4 and 5 a slightly modified form of construction is illustrated in which the floor 13ª of the oven or furnace is provided with openings 50ª to receive conduits 70. These conduits are relatively large and each conduit is flared outwardly at its upper end to provide an enlarged chamber 71. The upper free end of the flared portion of each conduit is threaded as at 72 to receive a gland nut 73 which acts on a gland follower 74 to compress asbestos packing 75 about the stem 21ª of the thermometer. The asbestos packing may conveniently be disposed in a chamber 76 which surrounds the thermometer stem and which is formed by a substantially Z-shaped member 77, one of which rests on the upper edge of the flared part of the conduit 70 and the other end of which surrounds the thermometer tube to support the packing.

Disposed within the conduit 70 is a second conduit 80, the latter however, being in spaced relation to the inner periphery of conduit 70 to provide an annular passage 81. Within the chamber 71 the conduit 80 is flared to provide a chamber 82 which receives the thermometer bulb 60ª.

The conduits 70 and 80 are connected to a cooling medium reservoir and a pump as are the conduits 62, and the upper flared portion of conduit 80 terminates short of the upper end of conduit 70 with the result that a cooling medium may flow upwardly through conduit 80 through chamber 82 and then down through chamber 71 and back to the reservoir through the annular passage 81 and conduit 70.

It will be obvious that with the constructions disclosed in Figs. 4 and 5, the thermometers may be located wholly within the furnace or oven and yet the bulb portions thereof may be shielded from the heat of the furnace and positively cooled by their contact with a cooling medium. As in the first described form of construction, the stem portions of the thermometers will be fired to the temperature desired, while the bulb portions thereof will be kept cool to prevent undue expansion of the expansible medium and thus distortion or rupture of the thermometer tubes.

From the above it will be apparent that the invention provides means whereby ceramic coloring materials may be utilized to form the graduation lines, numerals, etc., on thermometer scales. The thermometers which have been previously graduated and incised have their incisions filled with a ceramic coloring material of the desired color and then the stem portions of these thermometers are fired while the bulb portions thereof are maintained at a low temperature.

It will be evident that any desired means might be provided for heating the furnace such as oil, gas, or the like, and that further any desired cooling means may be utilized, such as refrigerated air or any desired cold liquid.

While two embodiments of the invention have been disclosed with some detail, it is to be understood that the description is for the purposes of illustration only and is not definitive of the limits of the inventive idea. And while the terms "fused" and "matured" have been used more or less interchangeably, it is to be understood that the terms refer to the physical change resulting from heat treatment of the coloring material to effect a substantially permanent bond between the material and the glass of the thermometer stem. The right is reserved to make such changes in the steps of the method and in the details of construction as will fall within the purview of the attached claim.

What I claim as my invention is:

In an apparatus of the class described, an oven having a floor provided with an opening, a packing gland carried by the floor of the oven and adapted to support a thermometer with the tube portion of the thermometer extending through the opening so that the scale portion thereof is located in the oven and the bulb portion of the thermometer is located exteriorly of the oven, said packing gland shielding the bulb portion of the thermometer from the heat of the oven, and heating means including a heating element on the floor of the oven for heating the oven to a temperature sufficiently high to fuse the ceramic coloring material.

JOSEPH F. GREENE.